United States Patent [19]

Takayama et al.

[11] 4,318,359

[45] Mar. 9, 1982

[54] PATTERN GENERATOR FOR ELECTRONIC SEWING MACHINES

[75] Inventors: Tsuneo Takayama, Musashino; Yoshinobu Tonomura, Hachioji, both of Japan

[73] Assignee: Janome Sewing Machine Co., Ltd., Tokyo, Japan

[21] Appl. No.: 175,202

[22] Filed: Jul. 31, 1980

[30] Foreign Application Priority Data

Aug. 10, 1979 [JP] Japan .......................... 54-109445[U]

[51] Int. Cl.³ .............................................. D05B 3/02
[52] U.S. Cl. ............................................... 112/158 E
[58] Field of Search .......... 112/158 E, 121.11, 121.12, 112/275, 277

[56] References Cited

U.S. PATENT DOCUMENTS

| | | | |
|---|---|---|---|
| 4,142,473 | 3/1979 | Itoh .................................. | 112/158 E |
| 4,220,101 | 9/1980 | Nanai et al. ..................... | 112/158 E |
| 4,227,472 | 10/1980 | Bergvall ........................... | 112/158 E |
| 4,236,469 | 12/1980 | Takenoya et al. .............. | 112/158 E |

*Primary Examiner*—Peter P. Nerbun
*Attorney, Agent, or Firm*—Michael J. Striker

[57] ABSTRACT

An electronic pattern stitch sewing machine is disclosed in which a pattern can be progressively enlarged and reduced at the beginnings thereof under control of a central processing unit (CPU).

6 Claims, 5 Drawing Figures

FIG_1A
FIG_1B
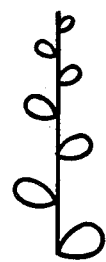
FIG_2
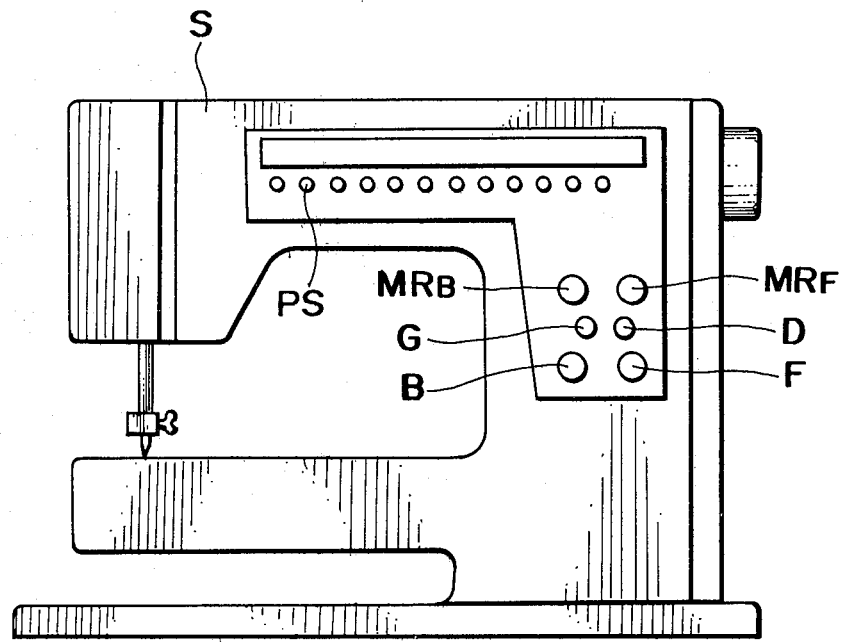

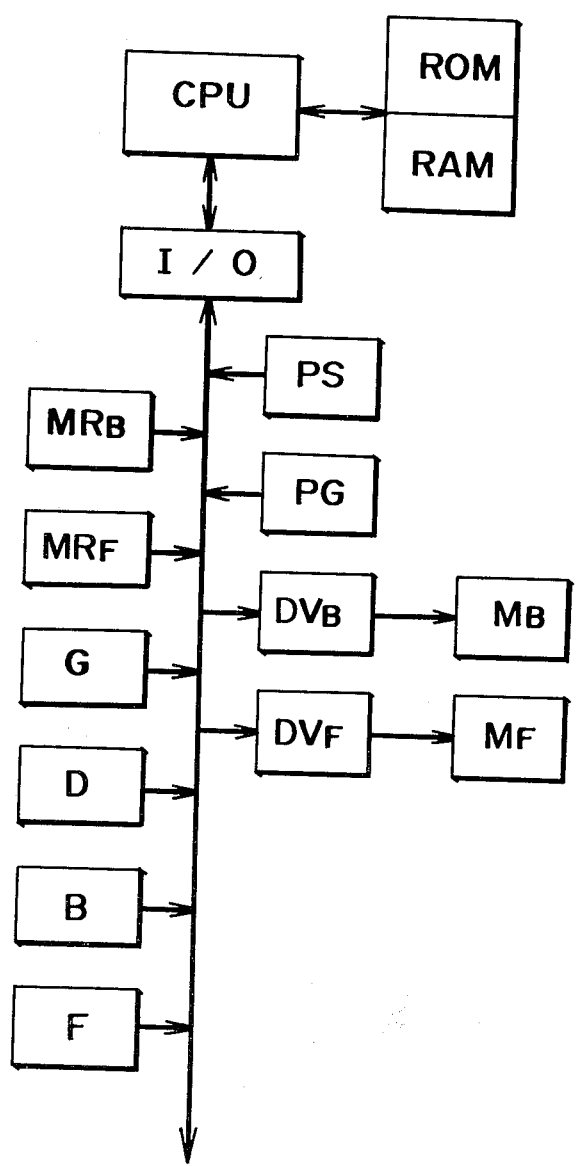
FIG_3

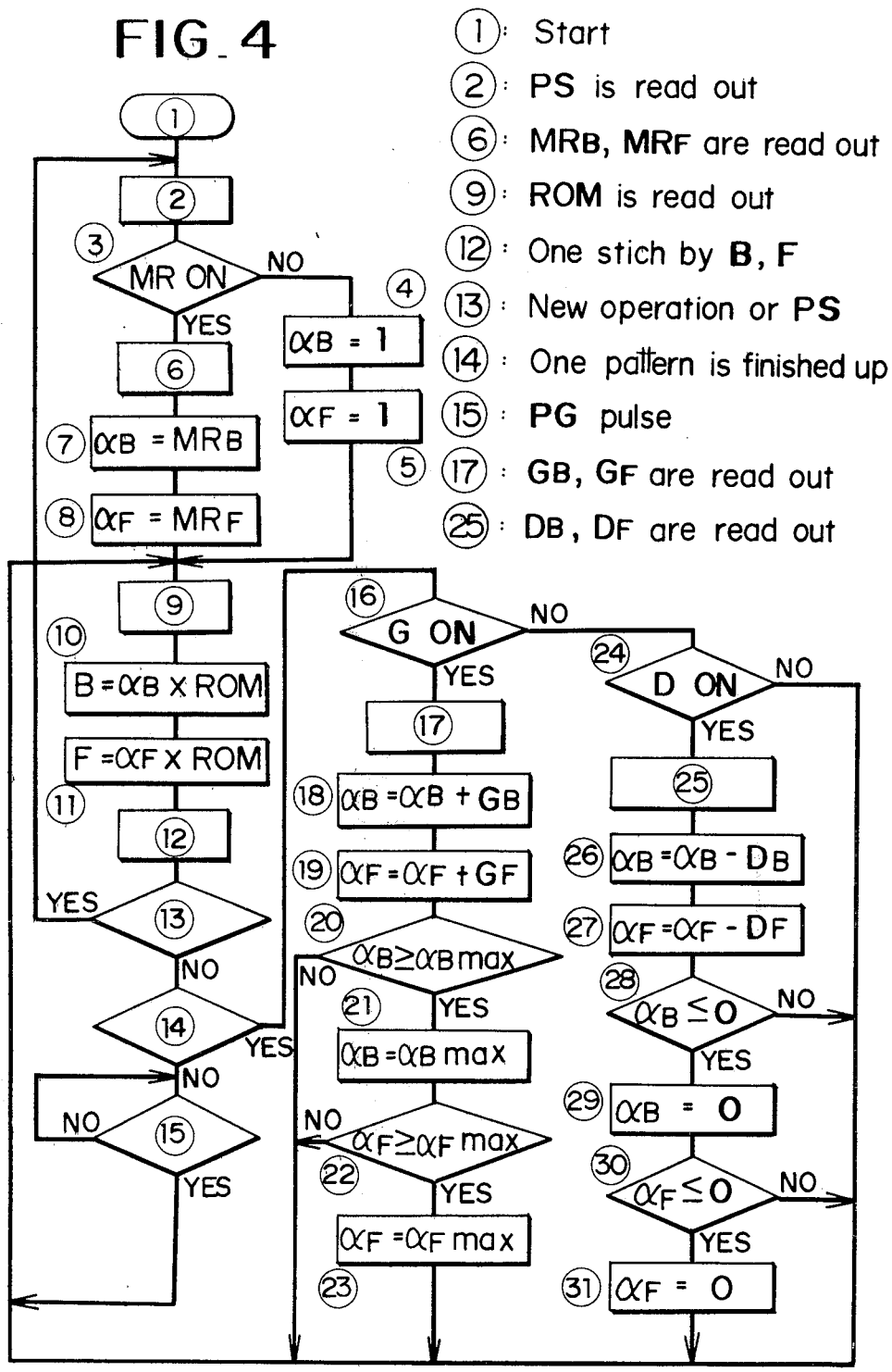

PATTERN GENERATOR FOR ELECTRONIC SEWING MACHINES

BRIEF DESCRIPTION OF THE INVENTION

The invention relates to a sewing machine, and more particularly relates to a pattern enlarging-reducing system of an electronic sewing machine which is electronically controlled to change the relative positions of the needle and the fabric to be sewn to produce a pattern of stitches. According to the invention, the needle swinging movement can be progressively increased and progressively decreased, as a pattern is stitched, to automatically produce a pattern such as shown in FIG. 1-(a). On the other hand, the needle swinging movement and the feeding amount can be progressively increased to automatically produce a pattern as shown in FIG. 1-(b). Thus the invention provides a further variety of patterns to meet the satisfaction of the machine users.

Known electronic sewing machines can produce the patterns which may be enlarged or reduced by a predetermined ratio. Such existing sewing machines, however, cannot produce the patterns which are progressively enlarged or progressively reduced as the patterns are stitched.

The present invention has been provided to eliminate such defects and disadvantages of the prior art.

It is a primary object of the invention to automatically and progressively enlarge or reduce the stitches of a cyclically produced pattern.

It is another object of the invention to provide such a pattern enlarging-reducing system which is simple in structure and easy in operation.

Many other features and advantages of the invention will be apparent from the following description of the embodiment in reference to the attached drawings.

BRIEF DESCRIPTION OF THE DRAWINGS

FIGS. 1a and 1b stitch patterns to be produced by a sewing machine incorporating the present invention, FIG. 2 shows an outlined view of an operating parts according to the invention, FIG. 3 shows a block diagram of the control circuit of the invention, and FIG. 4 shows a flow chart for explanating the operation of the control circuit shown in FIG. 3.

DETAILED DESCRIPTION OF THE INVENTION

In FIG. 2, S is a machine housing, and PS is a pattern selecting part composed of a plurality of push buttons. When one of these buttons corresponding to a desired pattern is pushed, that pattern, which is not enlarged nor reduced, is automatically set. $MR_B$ is a needle amplitude adjusting button which is pushed to be operative, and which is rotated to enlarge or reduce the needle amplitude in a predetermined ratio in dependence upon the rotation amount thereof. $MR_F$ is a feed adjusting button which is pushed to be operative, and is rotated to enlarge or reduce the feeding amount in dependence upon the rotation amount thereof. If these buttons $MR_B$, $MR_F$ are pushed once again, the machine is returnd to the initial automatic set condition. G is a switch which is pushed to progressively enlarge a selected pattern. D is a switch which is pushed to progressively reduce a selected pattern. When those switches G, D are pushed again, the sewing machine is returned to the initial automatic set condition. B is an operating button which is pushed to be operative and is rotated to designate the ratio for progressively enlarging or reducing the needle swinging movement. F is an operating button which is pushed to be operative and is rotated to designate the ratio for progressively enlargeing or reducing the feeding amount. The buttons B, F are pushed again to be inoperative.

In FIG. 3, ROM is a read-only-memory which stores a plurality of stitch pattern control signals and program control signals. CPU is a central processing unit for executing the programs. RAM is a random-access-memory which temporarily stores the processes of the programs and the results thereof. I/O is an input-output port. ROM, CPU, RAM and I/O together compose a microcomputer. When the desired pattern is selected by the pattern selecting part PS, the result is temporarily stored in RAM. PG is a pulse generator which is rotated in synchronism with rotation of the upper shaft to give one pulse per predetermined angular rotation thereof to CPU for reading out the stitch control signals from ROM. $DV_B$ and $DV_F$ are electric driving parts for driving the needle control motor $M_B$ and the fabric feed control motor $M_F$ in accordance with the signals from CPU. The switching operations and the adjusting values by the buttons $MR_B$ and $MR_F$ are read out by CPU and temporarily stored in RAM. The switching operations of the switches G and D are read out by CPU and temporarily stored in RAM. The adjusting values of the buttons B, F are read out by CPU and temporarily stored in RAM.

The operation of the above mentioned structure will be explained in reference to the flow chart in FIG. 4. When the control power source is turned on, the control circuit in FIG. 3 begins to operate and the program is started. The operation of the pattern selecting part PS is read out, and it is determined whether or not the needle and feed adjusting buttons $MR_B$, $MR_F$ are pushed, i.e., turned on. If they are turned on, the adjusting values of the adjusting buttons $MR_B$, $MR_F$ are read out, and the values are stored as $\alpha B$, $\alpha F$ for enlarging or reducing the ratios of the needle swinging amplitude and the fabric feeding amount. ($\alpha$ greater than 1, is an enlargement. $\alpha$ less than 1 is a reduction). If adjusting buttons $MR_B$, $MR_F$ are not pushed $\alpha B=1$ and $\alpha F=1$ are stored as the automatic set values. This determination as shown in the FIG. 4, is to be made simultaneously on adjusting buttons $MR_B$, $MR_F$. However, if only one of them is operated, the determination is made as to the operated button, and the final operational result is employed before the start of the sewing machine. Next the initially selected needle and feed control signals are read out from ROM. These control signals are each multiplied by the pattern enlarging-reducing ratios $\alpha B$, $\alpha F$, to thereby determine the values of initial stitch control signals to be delivered to the driving parts $DV_B$, $DV_F$ for controlling the needle swing control motor $M_B$ and the feed amount control motor $M_F$. When the machine motor (not shown) is driven and sews one stitch, and when the pulse generator PG issues a pulse, the second stitch control signal is read out and the stitch is formed with the same enlarging-reducing ratios $\alpha B$, $\alpha F$ as mentioned above, and thus each of stitches of the pattern is formed.

When the final stitch of the pattern is formed, it is determined whether or not the progressive pattern enlarging switch G has been operated (the subsequent operation serves as a cancellation). If the switch G has been operated, the adjusting values set on of one or both of the amplitude adjusting button B and the feed amount adjusting button F are read out (the subsequent pushing operation serves as a cancellation). These values are made as the increasing ratios $G_B$, $G_F$ of the needle amplitude and the fabric feed, to which the initial pattern enlarging-reducing ratios $\alpha B$, $\alpha F$ are added to provide a new $\alpha B$ and a new $\alpha F$, to thereby progressively enlarge the second repitition of the selected pattern. When the final stitch of the pattern is formed, the pattern enlarging ratios $G_B$, $G_F$ are added to the most recently computed ratios $\alpha B$, $\alpha F$ and the third repetition of the pattern is still more enlarged. When the enlarging or reducing ratios $\alpha B$, $\alpha F$ of the needle amplitude and the fabric feed increase to their maximum values $\alpha B$ max, $\alpha F$ max, $\alpha B$, $\alpha F$ stay constant thereafter.

If the switch G is not operated, it is determined whether or not the progressive pattern reducing switch D has been operated. With respect to the switches G, D, a first operated switch is made inoperative by a switch operated later (subsequent operation of the same switch serves as a cancellation thereof). If the operation has been determined to have taken place, the adjusting values set on of one or both of the amplitude adjusting button B and the feed amount adjusting button F is read out, and those values are used as the decreasing ratios $D_B$, $D_F$ of the needle amplitude and the fabric feed. The ratios $D_B$, $D_F$ are subtracted from the first mentioned pattern enlarging or reducing ratios $\alpha B$, $\alpha F$ to provide new $\alpha B$, $\alpha F$, thereby progressively reducing the second repetition of the selected pattern. Following repetitions of the patterns are similarly progressively reduced. When the enlarging or reducing ratios $\alpha B$, $\alpha F$ of the needle amplitude or the fabric feed approach zero or their designated minimum values, these ratios $\alpha B$, $\alpha F$ are set to zero or the minimum value in dependence on the patterns selected. When the pattern selecting device PS is newly operated at the beginning of stitching or in the course thereof, the other operating parts are all cancelled and the program is controlled in accordance with new operation. When the stitches are actually formed in the control of the flow chart, and when the pattern enlarging-reducing ratios $\alpha B$, $\alpha F$ become $\alpha B$ max, $\alpha F$ max, or 0 or the designated minimum value, the sewing machine is stopped if necessary for resetting.

The formation of the pattern starting from the minimum value of one or both of the needle amplitude and the fabric feed as shown in FIG. 1 may be carried out by switching on the needle and feed adjusting buttons MR in the flow chart in FIG. 4 and by setting one or both of these values $MR_B$, $MR_F$ to the minimum values. Similarly it is possible to form a pattern starting from the various sizes by optionally setting the adjusting values. The present example does not include the automatic stop of the sewing machine. However in the case that the sewing machine is provided with a braking device of the machine motor and a de-clutch device for releasing the sewing machine from the driving force of the machine motor, for rapid stopping, if any one of the discriminations of $\alpha B > \alpha B$ max, $\alpha F = \alpha F$ max, $\alpha B \leq 0$, $\alpha F \leq 0$ is YES, it is possible to automatically stop the sewing machine by issuing the machine stopping signal. In this case, an operating part for cancelling the stop is separately required. At the operation time of such an operating part it is preferable to maintain the pattern enlarging or reducing ratios $\alpha B$, $\alpha F$. This is, however, easily attained by slightly modifying the flow chart in FIG. 4.

We claim:

1. An improvement to a pattern generator that produces enlargements and reductions in patterns to be sewn in a manner that such production is invarient in size while patterns are continuously repeatedly stitched, comprising:

a central processing unit determining beginnings and ends of patterns during stitching and operating in a manner that a pattern can be enlarged and reduced at a beginning thereof in response to an appropriate command; and at least one switch connected to the central processing unit and providing an appropriate command to the central processing unit when said at least one switch is operated by a user, whereby during continuous repeated stitching of a pattern, the pattern can be progressively enlarged and reduced at beginnings thereof.

2. The improvement defined by claim 1, wherein the patterns are two-dimensional.

3. The improvement defined by claim 1, wherein enlargement and reduction take place at a constant ratio during stitching.

4. The improvement defined by claim 3, wherein the constant ratio may be selected from a range of available ratios.

5. The improvement defined by claim 1, wherein there is a first switch and a second switch, the first switch providing a command to enlarge the pattern, and the second switch providing a command to reduce the pattern.

6. The improvement defined by claim 2, wherein each dimension of the pattern may be independently enlarged and reduced.

* * * * *